(12) United States Patent
Oikawa et al.

(10) Patent No.: US 8,577,577 B2
(45) Date of Patent: Nov. 5, 2013

(54) MOVING BODY, METHOD OF CONTROLLING THE SAME, AND PROGRAM

(75) Inventors: Susumu Oikawa, Yokohama (JP); Yusuke Kosaka, Chofu (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 158 days.

(21) Appl. No.: 12/872,556

(22) Filed: Aug. 31, 2010

(65) Prior Publication Data

US 2011/0060513 A1    Mar. 10, 2011

(30) Foreign Application Priority Data

Sep. 4, 2009   (JP) ................. 2009-204659

(51) Int. Cl.
*B60T 7/12*   (2006.01)
*G05D 1/00*   (2006.01)
*G06F 7/00*   (2006.01)
*G06F 17/00*  (2006.01)

(52) U.S. Cl.
USPC ............... 701/87; 701/69; 701/70; 701/82; 701/91; 180/21; 180/218

(58) Field of Classification Search
USPC .......... 701/99, 69, 70, 82, 84, 87–91; 180/21, 180/218
See application file for complete search history.

(56) References Cited

U.S. PATENT DOCUMENTS

| | | | |
|---|---|---|---|
| 2,462,541 A * | 2/1949 | Norden ........................ | 74/5.44 |
| 6,288,505 B1 * | 9/2001 | Heinzmann et al. ......... | 318/139 |
| 6,302,230 B1 * | 10/2001 | Kamen et al. ................ | 180/171 |
| 6,332,103 B1 * | 12/2001 | Steenson et al. ............. | 701/1 |
| 6,789,640 B1 * | 9/2004 | Arling et al. ................. | 180/282 |
| 2004/0140401 A1 * | 7/2004 | Yamashita .................... | 244/165 |
| 2007/0296170 A1 * | 12/2007 | Field et al. ............... | 280/47.131 |
| 2008/0018443 A1 * | 1/2008 | Kamen et al. ................ | 340/439 |

FOREIGN PATENT DOCUMENTS

| | | |
|---|---|---|
| JP | 62181985 A | 8/1987 |
| JP | 63305082 | 12/1988 |
| JP | 2004-276727 A | 10/2004 |
| JP | 3722493 | 9/2005 |
| JP | 2009-101760 A | 5/2009 |

OTHER PUBLICATIONS

Office Action issued Jul. 12, 2011 in Japanese Patent Application No. 2009-204659 and partial English translation thereof.

* cited by examiner

*Primary Examiner* — Jeffrey Shapiro
(74) *Attorney, Agent, or Firm* — Kenyon & Kenyon LLP

(57) ABSTRACT

A vehicle includes a support member and at least one wheel attached to the support member. The support member is capable of oscillating in a front-back direction of the vehicle. The vehicle further includes a torque control unit applying torque to the wheel, and a control loop controlling the torque control unit to adjust the torque applied to the wheel to allow the vehicle to travel while keeping an inverted state of the support member. The control loop controls the torque control unit to apply normal torque and additional torque to the wheel, the normal torque determined according to a deviation between a target value and a controlled variable including at least one of an inclination angular velocity and an inclination angle of the support member in the front-back direction, the additional torque determined according to a power of a velocity parameter of the vehicle.

17 Claims, 4 Drawing Sheets

MOVING BODY, METHOD OF CONTROLLING THE SAME, AND PROGRAM

INCORPORATION BY REFERENCE

This application is based upon and claims the benefit of priority from Japanese patent application No. 2009-204659, filed on Sep. 4, 2009, the disclosure of which is incorporated herein in its entirety by reference.

BACKGROUND OF THE INVENTION

1. Field of the Invention

The present invention relates to velocity control of a moving body including a support member, at least one ground-contacting element, and a control loop. The support member supports a subject including an occupant. The ground-contacting element is attached to the support member. The control loop adjusts torque applied to the ground-contacting element so as to allow the moving body to travel while keeping an inverted state of the support member.

2. Description of Related Art

A moving body that includes a support member, at least one ground-contacting element, and a control loop has been known. The support member supports a subject including an occupant. The ground-contacting element is attached to the support member. The control loop adjusts torque applied to the ground-contacting element so as to allow the moving body to travel while keeping an inverted state of the support member. Such a moving body is called inverted pendulum type moving body, since it exercises inverted pendulum control to keep the support member inverted. Hereinafter, the term "moving body" means inverted pendulum type moving body unless otherwise specified. For example, for any moving body travelling with two wheels arranged in parallel, the wheels correspond to the ground-contacting element, and the vehicle body on which an occupant can mount corresponds to the support member.

Japanese Patent No. 3722493 discloses a technique that relates to velocity limiting control of a moving body. According to this technique, a control loop determines torque applied to a ground-contacting element according to an inclination angle (hereinafter referred to as pitch angle) of a support member in a front-back direction (pitch direction) or a temporal differentiation of the inclination angle and a correction value of the pitch angle. The control loop transits to a velocity limiting mode when the velocity of the moving body exceeds a certain value. In the velocity limiting mode, the control loop controls the moving body to apply additional torque to the ground-contacting element by applying the correction'value of the pitch angle. For example, when the moving body travels forwardly, the additional torque is applied to the ground-contacting element. Then, the supporting member is inclined backwardly and the pitch angle is returned to its original value. Hence, the torque determined by the following control loop is decreased, thereby limiting further increase in the vehicle velocity.

SUMMARY OF THE INVENTION

However, according to the technique disclosed in Japanese Patent No. 3722493, the normal travelling mode and the velocity limiting mode are switched. This switching may cause unacceptable behavior for an occupant. Further, the occupant perceives the switching of the modes and thus feels extremely "limited".

The present inventors have examined how to introduce an offset term determined by a continuous function into a control loop in a whole speed range without switching the modes from the normal travelling mode to the velocity limiting mode. As the offset term causes additional torque, the pitch angle of the support member is corrected. However, simple introduction of the offset term determined by the continuous function of the velocity causes positive feedback in the offset term in the control loop, which may cause oscillation of the control loop.

The present invention has been made to overcome the above problems. The present invention aims to provide a moving body and a method of controlling the velocity of the moving body that control velocity of the moving body by natural behavior for the occupant without switching modes between the mode in which the velocity limiting is performed and the mode in which the velocity limiting is not performed.

A first exemplary aspect of the present invention is a moving body including a support member supporting a subject and at least one ground-contacting element with a circular cross section, the ground-contacting element attached to the support member. The support member is capable of oscillating at least in a front-back direction of the moving body during travelling of the moving body. The moving body further includes a drive portion applying torque to the ground-contacting element, and a control loop coupled to the drive portion and controlling the drive portion to adjust the torque applied to the ground-contacting element so as to allow the moving body to travel while keeping an inverted state of the support member. The control loop controls the drive portion to apply normal torque and additional torque to the ground-contacting element, the normal torque being determined according to a deviation between a target value and a controlled variable including at least one of an inclination angular velocity and an inclination angle of the support member in the front-back direction, the additional torque being determined according to a power of a velocity parameter of the moving body.

According to the above structure, the additional torque is difficult to be produced in a low-velocity range. Hence, the additional torque can be applied precipitously with the increase in the velocity of the moving body while efficiently suppressing the oscillation of the control loop. Further, the additional torque can be continuously changed according to the change of the velocity parameter of the moving body.

Preferably, in the first exemplary aspect of the present invention, since addition of an inertia force to the support member due to the additional torque raises an inclination of the support member in an opposite direction to a moving direction of the moving body, the control loop subsequently controls the drive portion to decrease the normal torque.

Hence, the velocity of the moving body can be suppressed.

Further, in the first exemplary aspect of the present invention, the control loop may control the drive portion based on a command value obtained by adding a first command value determined according to a magnitude of the deviation and a second command value determined according to a magnitude of a power of the velocity parameter.

Furthermore, in the first exemplary aspect of the present invention, the control loop may control the drive portion so as to apply the additional torque by increasing the deviation in a pseudo manner by increasing or decreasing the target value according to the power of the velocity parameter of the moving body.

A second exemplary aspect of the present invention is a method of controlling travelling of a moving body. The moving body includes a support member supporting a subject and capable of oscillating at least in a front-back direction of the moving body during travelling of the moving body, at least one ground-contacting element with a circular cross section, the ground-contacting element attached to the support member, a drive portion applying torque to the ground-contacting element, and a control loop coupled to the drive portion and controlling the drive portion to adjust the torque applied to the ground-contacting element so as to allow the moving body to travel while keeping an inverted state of the support member. The method includes controlling the drive portion by the control loop to apply normal torque and additional torque to the ground-contacting element, the normal torque being determined according to a deviation between a target value and a controlled variable including at least one of an inclination angular velocity and an inclination angle of the support member in the front-back direction, the additional torque being determined according to a power of a velocity parameter of the moving body.

According to the above structure, the additional torque is difficult to be produced in a low-velocity range. Hence, the additional torque can be applied precipitously with the increase in the velocity of the moving body while efficiently suppressing the oscillation of the control loop. Further, the additional torque can be continuously changed according to the change of the velocity parameter of the moving body.

A third exemplary aspect of the present invention is a non-transitory computer readable media storing a program for causing a computer to exercise travelling control over a moving body. The moving body includes a support member supporting a subject and capable of oscillating at least in a front-back direction of the moving body during travelling of the moving body, at least one ground-contacting element with a circular cross section, the ground-contacting element attached to the support member, a drive portion applying torque to the ground-contacting element, and a control loop coupled to the drive portion and controlling the drive portion to adjust the torque applied to the ground-contacting element so as to allow the moving body to travel while keeping an inverted state of the support member. The travelling control includes controlling the drive portion by the control loop to apply normal torque and additional torque to the ground-contacting element, the normal torque being determined according to a deviation between a target value and a controlled variable including at least one of an inclination angular velocity and an inclination angle of the support member in the front-back direction, the additional torque being determined according to a power of a velocity parameter of the moving body.

According to the above structure, the additional torque is difficult to be produced in a low-velocity range. Hence, the additional torque can be applied precipitously with the increase in the velocity of the moving body while efficiently suppressing the oscillation of the control loop. Further, the additional torque can be continuously changed according to the change of the velocity parameter of the moving body.

According to the exemplary aspects of the present invention mentioned above, velocity of the moving body can be suppressed by natural behavior for the occupant without switching modes between the mode in which the velocity limiting is performed and the mode in which the velocity limiting is not performed.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

Hereinafter, exemplary embodiments of the present invention will be described with reference to the drawings.

Figure 1:
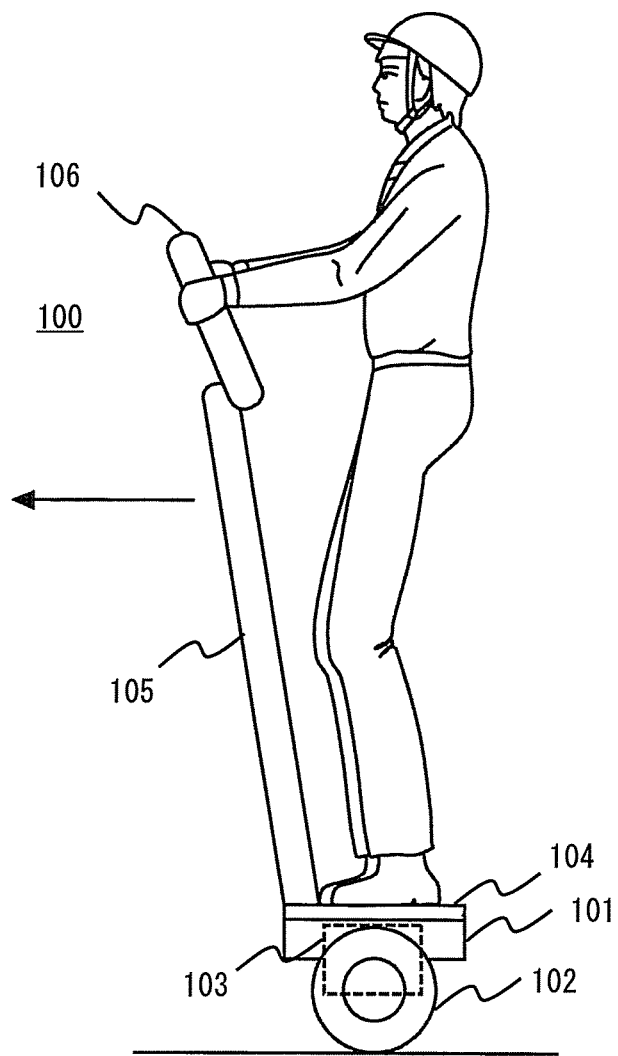
FIG. 1 shows an external view of an inverted pendulum type moving body according to a first exemplary embodiment.

In a first exemplary embodiment, a parallel two-wheel vehicle, which is one of inverted pendulum type moving bodies, will be described. The parallel two-wheel vehicle includes two wheels as a ground-contacting element having a circular cross section. Hereinafter, an inverted pendulum type moving body according to the first exemplary embodiment is referred to as "vehicle". FIG. 1 shows one example of an external view of a vehicle 100 according to the first exemplary embodiment.

The vehicle 100 includes a support member 101, two right and left wheels 102, and at least one torque control unit 103 that applies torque to the right and left wheels 102. In FIG. 1, the support member 101 is configured to allow an occupant to ride in a standing posture. The support member 101 includes a step 104 on which the occupant puts his/her feet, a stay 105 extending from the step 104, and a handle 106 attached to an upper end portion of the stay 105. At least one of the step 104, the stay 105, and the handle 106 allows the occupant to keep the posture, and is used to allow the occupant to manipulate the vehicle 100. While being supported by the right and left wheels 102, the support member 101 at least lacks stability in the pitch direction during travelling of the vehicle 100, and is capable of oscillating in the pitch direction.

The torque control unit 103 applies torque to the right and left wheels 102 based on a torque command determined by a control loop. Typically, the torque control unit 103 is a drive portion with a motor.

Although not shown in FIG. 1, the vehicle 100 includes a control loop that executes travelling control of the vehicle 100 and posture control of the support member 101 by the inverted pendulum control. The control loop adjusts the torque applied to the right and left wheels 102 by the torque control unit 103 so as to allow the vehicle 100 to travel while keeping the inverted state of the support member 101.

Figure 2:
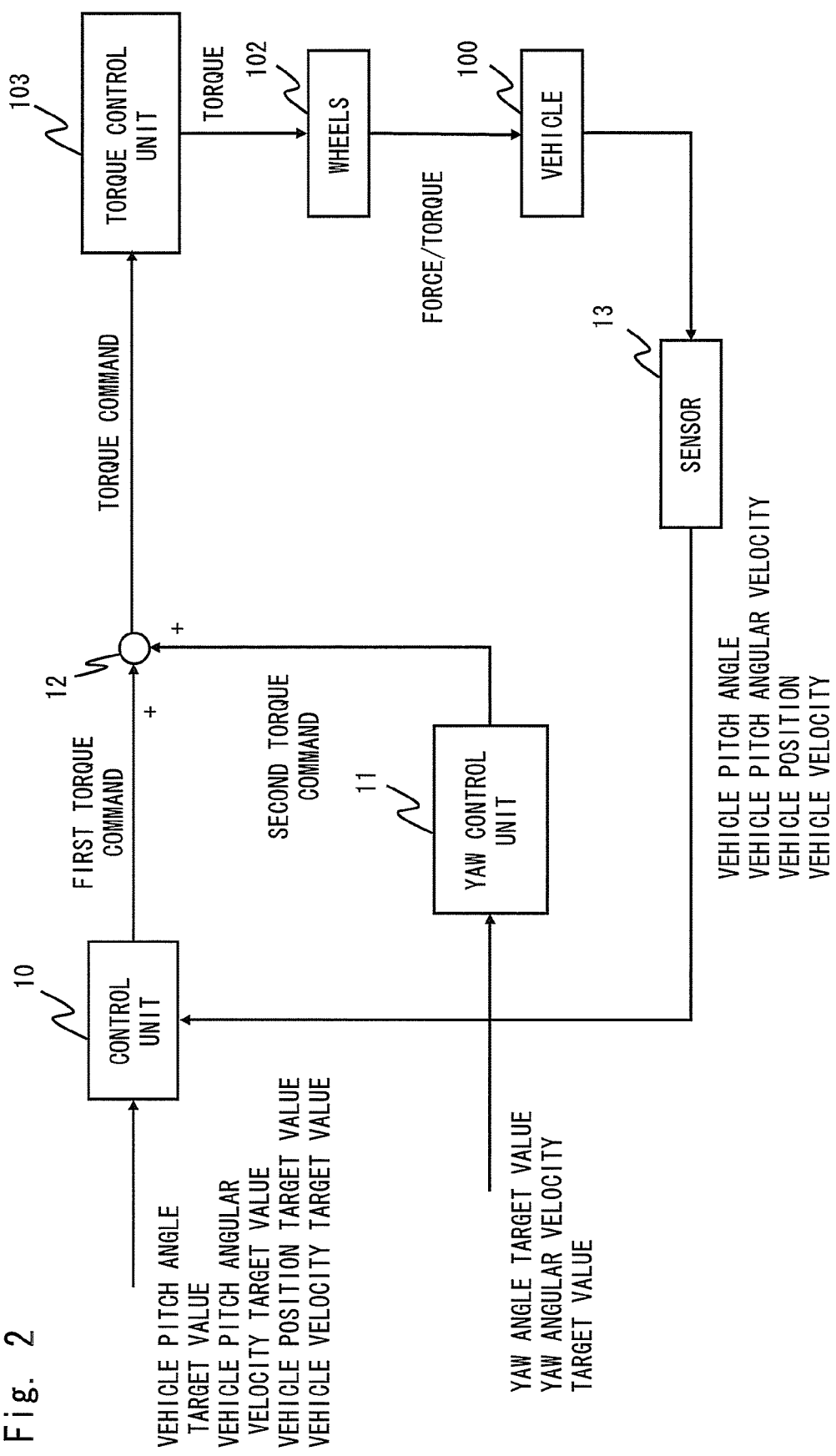
FIG. 2 shows a control loop of the inverted pendulum type moving body according to the first exemplary embodiment.

Next, the control loop of the vehicle 100 will be described. FIG. 2 is a block diagram showing a specific example of the control loop of the vehicle 100. The control loop uses at least one parameter having a correlation with the pitch angle of the support member 101 and at least one parameter having a correlation with the velocity of the vehicle 100 as controlled variables, and executes feedback control using the torque applied to the wheels 102 through the torque control unit 103 as the degree of manipulation.

Specific examples of the parameter having a correlation with the pitch angle of the support member 101 include a pitch angle of the support member 101 or a pitch angular velocity. Specific examples of the parameters having correlation with the velocity of the vehicle 100 include the rotational speed of the wheels 102 (hereinafter referred to as wheel speed), the rotational speed of a motor included in the torque control unit 103, the angular velocity of the wheels 102, the angular velocity of the motor included in the torque control unit 103, the velocity of the vehicle 100 (translational velocity), the acceleration of the vehicle 100, and the position of the vehicle 100. In the example shown in FIG. 2, the pitch angle and the pitch angular velocity of the support member 101 are used as parameters having correlation with the pitch angle of the support member 101. Further, in the example shown in FIG. 2, the position of the vehicle 100 and the translational velocity of the vehicle 100 are used as parameters having correlation with the velocity of the vehicle 100. As a matter of course, the parameter having a correlation with the pitch angle of the support member 101 and the parameter having a correlation with the velocity of the vehicle 100 may be selected as appropriate, and the example shown in FIG. 2 is merely one example. Hereinafter, the pitch angle and the pitch angular velocity of the support member 101 are referred to as "vehicle pitch angle" and "vehicle pitch angular velocity", respectively. Further, the position of the vehicle 100 and the translational velocity of the vehicle 100 are referred to as "vehicle position" and "vehicle velocity", respectively. For the vehicle pitch angle, the state in which the step 104 is parallel is called an origin, the forward inclination of the vehicle 100 is called positive direction, and the backward inclination of the vehicle 100 is called negative direction.

Now, each element shown in FIG. 2 will be described. A sensor 13 measures the vehicle pitch angle, vehicle pitch angular velocity, vehicle position, and vehicle velocity that are controlled variables, and outputs the measured amount to the control unit 10. The sensor 13 includes, for example, an encoder (not shown) that measures the rotation amount of the motor included in the wheels 102 or the torque control unit 103, a rate gyro (not shown) that measures the pitch angular velocity of the support member 101, and a controlled variable calculation unit (not shown) that calculates each controlled variable using the measurement results in the encoder and the rate gyro.

The control unit 10 generates a first torque command to move the vehicle 100 in the forward direction or backward direction, and supplies the first torque command to the torque control unit 103. The control unit 10 generates the first torque command so that an additional torque as well as a normal torque is applied to the wheels 102. The normal torque is determined according to the deviation between each controlled variable and the control target value regarding each controlled variable; the additional torque is increased or decreased depending on a power of the velocity parameter of the vehicle 100. The velocity parameter of the vehicle 100 is a physical amount that is increased or decreased in proportional to the velocity of the vehicle 100. Specific examples of the velocity parameter of the vehicle 100 include the vehicle velocity (translational velocity of the vehicle 100), the rotational speed of the wheels 102, and the rotational speed of the motor included in the torque control unit 103. Specific examples to generate the first torque command to generate the additional torque applied to the wheels 102 will be described later.

A yaw control unit 11 generates a second torque command to swing the vehicle 100 in the lateral direction, and supplies the second torque command to the torque control unit 103. The yaw control unit 11 generates the second torque command according to the yaw angle target value and the yaw angular velocity target value. The yaw angle target value and the yaw angular velocity target value are generated based on the degree of manipulation conducted by the occupant on at least one of the step 104, the stay 105, and the handle 106. For example, the inclination amount of the stay 105 and the handle 106 in the roll direction, or the moving amount of center of gravity of the occupant on the step 104 is measured as the degree of manipulation, and a target value generation unit (not shown) may generate the yaw angle target value and the yaw angular velocity target value from the degree of manipulation.

A calculation unit 12 generates composite torque command by combining the first torque command and the second torque command, and supplies the composite torque command to the torque control unit 103. More specifically, as shown in FIG. 2, the calculation unit 12 may generate the composite torque command by adding the first torque command and the second torque command.

The torque control unit 103 drives the wheels 102 based on the torque command that is received. The torque control unit 103 applies torque according to the magnitude of the torque command to the wheels 102.

The wheels 102 to which the torque is applied are contacted to the ground. Then, the force to rotate the wheels 102 is converted into the force to move the vehicle 100 by the friction of the wheels 102 with the ground. This enables the vehicle 100 to travel.

As discussed above, the control unit 10 generates the first torque command to apply the additional torque to the wheels 102. The additional torque increases or decreases depending on the power of the velocity parameter of the vehicle 100. Therefore, the torque control unit 103 applies the additional torque that is increased or decreased depending on the power of the velocity parameter of the vehicle 100 to the wheels 102 according to the composite torque command that reflects the first torque command.

For example, by applying the additional torque to the wheels 102 travelling forward, the acceleration of the wheels 102 increases. This causes addition of inertia force to the support member 101 in the reverse direction to the travelling direction of the wheels 102, which raises the support member 101 and reduces the vehicle pitch angle. This reduces the vehicle pitch angle measured by the sensor 13. Therefore, in the following feedback loop, the control unit 10 generates the first torque command to decrease the torque of the wheels 102. Hence, it is possible to suppress an excessive increase in the vehicle velocity.

Now, a specific example to add the additional torque that is increased or decreased according to the power of the velocity parameter of the vehicle 100 to the wheels 102 will be described. In a first example to add the additional torque, the control unit 10 may generate the first torque command by correcting the normal torque command component that is determined according to the deviation between each controlled variable and each control target value by the offset component that depends on the power of the velocity parameter of the vehicle 100.

The normal torque command component is generated to cancel the deviation between each control target value and each controlled variable measured by the sensor 13, as is similar to the feedback control that is typically performed. The control target values regarding each controlled variable (vehicle pitch angle target value, vehicle pitch angular velocity target value, vehicle position target value, and vehicle velocity target value) are generated based on the degree of manipulation conducted by the occupant on at least one of the step 104, the stay 105, and the handle 106. For example, a target value generation unit (not shown) may generate the control target values and supply the values to the control unit 10.

On the other hand, the offset component is determined according to the power of the velocity parameter of the vehicle 100. For example, the offset component may be calculated by multiplying the power of the velocity parameter by a certain gain (coefficient).

The first torque command $\tau_{COM}$ in the first example can be expressed by the following expression (1), by adding the normal torque command component $\tau_1$ and the offset component $\tau_{offset}$. Further, specific examples of the normal torque command component $\tau_1$ and the offset component $\tau_{offset}$ are shown by the following expressions (2) and (3).

$$\tau_{COM} = \tau_1 + \tau_{offset} \quad (1)$$

$$\tau_1 = Kpp \cdot (\beta_r - \beta) + Kdp \cdot (\beta'_r - \beta') + Kpx \cdot (x_r - x) + Kdx \cdot (v_r - v) \quad (2)$$

$$\tau_{offset} = Kc \cdot v^N \quad (3)$$

In the expressions (2) and (3), $\beta$ is the vehicle pitch angle, $\beta_r$ is the vehicle pitch angle target value, $\beta'$ is the vehicle pitch angular velocity, $\beta'_r$ is the vehicle pitch angular velocity target value, x is the vehicle position, $x_r$ is the vehicle position target value, v is the vehicle velocity, and $v_r$ is the vehicle velocity target value. The symbol N that indicates the power number is an integer of two or more. Further, each of Kpp, Kdp, Kpx, Kdx, and Kc is a gain, and is appropriately determined based on the influence of the external force including the center of gravity, and physical parameters of the system. The right side of the expression (2) at least includes a term regarding the vehicle pitch angle $\beta$ or the vehicle pitch angular velocity $\beta'$.

In the expression (3), the offset component $\tau_{offset}$ is determined as the value that is proportional to the power of the vehicle velocity v. However, as stated above, the vehicle velocity v is merely one of the velocity parameter of the vehicle 100. For example, the offset component $\tau_{offset}$ may be determined by the following expression (4) in place of the expression (3). In the expression (4), the offset component $\tau_{offset}$ is determined as the value that is proportional to the power of the wheel speed $\theta'$.

$$\tau_{offset} = Kc \cdot \theta'^N \quad (4)$$

The specific example to apply the additional torque to the wheels 102 is not limited to the above-described first example in which the offset component is added to the normal torque command component. In a second example to apply the additional torque to the wheels 102, at least one of the control target values $\beta_r$, $\beta'_r$, $x_r$, and $v_r$ included in the normal torque command component in the above expression (2) is corrected to be increased or decreased according to the power of the velocity parameter of the vehicle 100. More particularly, the correction term which is similar to the expression (3) or (4) dependent on the power of the velocity parameter of the vehicle 100 may be added to at least one of the control target values $\beta_r$, $\beta'_r$, $x_r$, and $v_r$. Accordingly, the deviation between the controlled variable measured in the sensor 13 and the corrected control target value is superficially increased, and the first torque command is determined to apply the additional torque to the wheels 102.

Now, advantages to generate the additional torque applied to the wheels 102 to increase or decrease according to the power of the velocity parameter of the vehicle 100 will be described.

Figure 3:
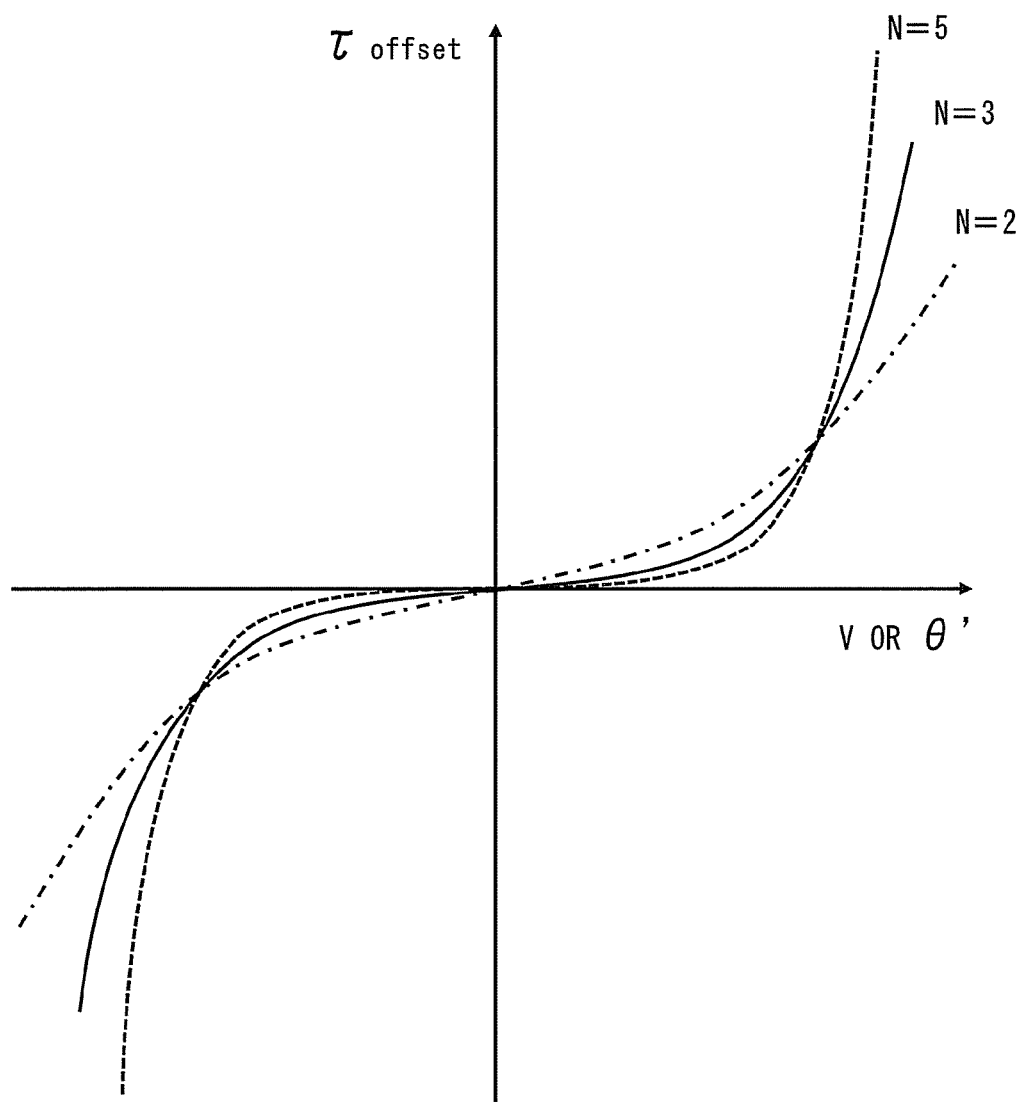
FIG. 3 shows an example of a command value offset amount according to the first exemplary embodiment.

FIG. 3 shows graphs showing a relation between the vehicle velocity or the wheel speed and the offset component $\tau_{offset}$ included in the first torque command. FIG. 3 shows graphs when the power number N is 2, 3, and 5. As shown in FIG. 3, when N=2, the graph is shown as a curve with an alternate long and short dash line; when N=3, the graph is shown as a curve with a solid line; when N=5, the graph is shown as a curve with a dotted line. The relation between the velocity parameter and the offset component $\tau_{offset}$ when using velocity parameters other than the vehicle velocity or the wheel speed may be expressed in the similar way as in FIG. 3. Further, the relation between the vehicle velocity or the wheel speed and the correction value when correcting any of the control target values in the above-described second example may be expressed in the similar way as in FIG. 3.

The following advantage is offered by generating the additional torque that is increased or decreased depending on the power of the velocity parameter of the vehicle 100 using the relation shown in the graphs in FIG. 3. In short, the additional torque continuously changes according to the change of the velocity parameter of the vehicle 100, and the additional torque is increased or decreased according to the increase or decrease in the vehicle velocity (velocity parameter of the vehicle 100). The following advantage is further offered by making the additional torque dependent on the power of the velocity parameter of the vehicle 100 compared with a case of making the additional torque dependent on the velocity parameter. In summary, additional torque is difficult to be produced in a low-velocity range, thereby efficiently suppressing oscillation of the control loop. Meanwhile, the additional torque may be applied precipitously with the increase in the vehicle velocity.

The difference in the relation between the velocity parameter of the vehicle 100 and the additional torque depending on the difference of the power number N will be described with reference to FIG. 3. For example, when N=5 and the vehicle velocity is low, the offset component $\tau_{offset}$ is smaller and the additional torque is smaller compared with a case of N=3. On the other hand, when N=5, the offset component $\tau_{offset}$ is steeply increased with the increase in the vehicle velocity. In this case, the offset component $\tau_{offset}$ is larger and the additional torque is larger compared with the case of N=3. In summary, by suppressing the velocity based on the offset component $\tau_{offset}$, when N=5, the velocity suppression degree is smaller than the case of N=3 if the vehicle velocity is low, and the velocity suppression degree is larger than the case of N=3 if the vehicle velocity is high.

In summary, by adjusting the value of the power number N, the response of the offset component $\tau_{offset}$ to the change of the vehicle velocity can be adjusted, and the velocity suppression effect by the additional offset can be adjusted.

When the vehicle velocity is high and the velocity suppression degree is too small, the velocity may accelerate over the velocity suppression degree. In this case, the value of Kc needs to be adjusted. The value of Kc may be adjusted when the velocity suppression effect needs to be adjusted in the forward direction and the backward direction as well.

Further, when N is an even number such as N=2, the command value offset amount has a sign opposite to the desirable one when the velocity parameter of the vehicle velocity is minus, or when the vehicle 100 moves backward. Hence, the sign of Kc needs to be reversed. On the other hand, when N is an odd number, the sign of Kc may be constant whether the velocity parameter is positive or negative, or whether the vehicle 100 moves forward or backward.

Further, in some vehicles having a certain shape including a certain approach angle and a certain departure angle, an upper limit and a lower limit need to be set in the offset component $\tau_{offset}$. In this case, the offset component $\tau_{offset}$ beyond or below the limits may be simply clipped. However, this clipped point causes discontinuity in the velocity suppression effect for an occupant. If it is not desirable, effect of body feeling may be enhanced by smoothing the clipped point using a low-pass filter or a function.

The values of the velocity parameters including the motor rotational speed or the vehicle velocity used for calculating the offset component $\tau_{\textit{offset}}$ are desirably derived by the filtering processing based on the history at a certain point. Preferably, a low-pass filter is used as the filter to minimize the effect occurred by sudden acceleration or deceleration.

Note that the present invention is not limited to the above-described exemplary embodiment, but may be changed as appropriate.

For example, the yaw control unit 11 may be omitted. Further, the first torque command may be corrected by adding the additional torque command to the first torque command before correction or by other calculations including multiplication.

In the first exemplary embodiment, the description has been given of the method of correcting the torque command generated in the control loop shown in FIG. 2 to apply the additional torque that is increased or decreased depending on the power of the velocity parameter of the vehicle 100 to the wheels 102. It should be noted, however, that various types of control loops may be applied to the parallel two-wheel vehicle, as already discussed above. In a second exemplary embodiment, another control loop will be described in detail.

Second Exemplary Embodiment

In a second exemplary embodiment, a parallel two-wheel vehicle, which is one of inverted pendulum type moving bodies, will be described as is similar to the first exemplary embodiment described above. In the second exemplary embodiment, the control loop shown in FIG. 2 in the first exemplary embodiment is modified. The whole structure of the parallel two-wheel vehicle according to the second exemplary embodiment is similar to that shown in FIG. 1.

Figure 4:
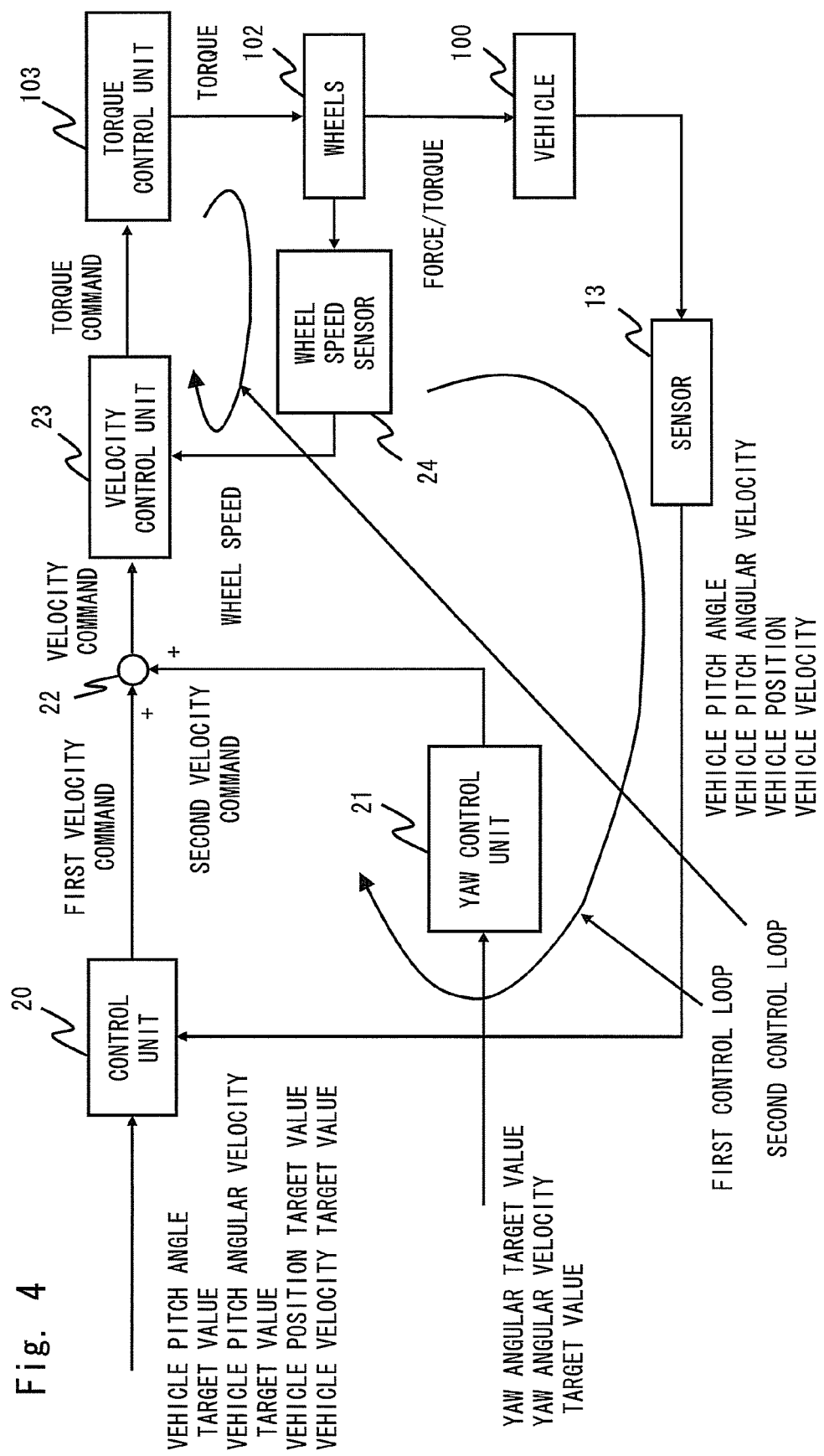
FIG. 4 shows a control loop of an inverted pendulum type moving body according to a second exemplary embodiment.

FIG. 4 is a block diagram of a control loop of the parallel two-wheel vehicle according to the second exemplary embodiment. The control loop shown in FIG. 4 includes two loops of a first control loop having a relatively slow speed of response and a second control loop having a relatively fast speed of response.

The first control loop includes a control unit 20 and a yaw control unit 21. The control unit 20 is similar to the control unit 10 shown in FIG. 2, but is different from the control unit 10 in that the control unit 20 generates a command value indicating the fluctuations of the wheel speed (rotational speed of the wheels 102). The control unit 20 generates a first velocity command that indicates fluctuations of the wheel speed according to the deviation between the control target value and controlled variables including the vehicle pitch angle, the vehicle pitch angular velocity, the vehicle position, and the vehicle velocity. The yaw control unit 21 corresponds to the yaw control unit 11 shown in FIG. 2. However, the yaw control unit 21 is different from the yaw control unit 11 in that it generates a command value (second velocity command) indicating the fluctuations of the wheel speed. The first and the second velocity commands are added by a calculation unit 22, and then supplied to a velocity control unit 23 as the command value indicating the fluctuations of the composite wheel speed.

The second control loop is an inner loop of the first control loop. The second control loop generates the torque command to attain the fluctuations of the wheel speed applied from the first control loop, and supplies the torque command to the torque control unit 103. The second control loop includes a wheel speed sensor 24 and a velocity control unit 23. The wheel speed sensor 24 measures the rotational speed of the wheels 102 used as the controlled variable in the second control loop. For example, the wheel speed sensor 24 includes an encoder (not shown) that measures the rotation amount of the motor included in the wheels 102 or the torque control unit 103, and calculates the wheel speed using the measurement result in the encoder. The velocity control unit 23 generates the torque command that is applied to the torque control unit 103 to increase or decrease the wheel speed according to the fluctuations indicated by the velocity command.

As stated above, the control loop in FIG. 4 includes the first control loop (outer loop) and the second control loop (inner loop). In order to apply the additional torque that is increased or decreased according to the power of the velocity parameter of the vehicle 100 to the wheels 102, the command value generated by any of the first and the second control loops is corrected by the offset value or the like that is dependent on the power of the velocity parameter of the vehicle 100.

As one example, when the offset component $\theta'_{\textit{offset}}$ that is dependent on the power of the velocity parameter is added to the first velocity command $\theta'_{COM}$ generated by the control unit 20, the following expressions (5) to (7) may be used. Further, the offset component $\theta'_{\textit{offset}}$ may be determined by the following expression (8) instead of the expression (7). In the expression (8), the offset component $\theta'_{\textit{offset}}$ is determined as the value that is proportional to the power of the wheel speed $\theta'$. As already described regarding the expression (2), the right-hand side in the expression (6) at least includes the teen regarding the vehicle pitch angle $\beta$ or the vehicle pitch angular velocity $\beta'$.

$$\theta'_{COM} = \theta'_1 + \theta'_{\textit{offset}} \quad (5)$$

$$\theta'_1 = Kpp \cdot (\beta_r - \beta) + Kdp \cdot (\beta'_r - \beta') + Kpx \cdot (x_r - x) + Kdx \cdot (v_r - v) \quad (6)$$

$$\theta'_{\textit{offset}} = Kc \cdot v^N \quad (7)$$

$$\theta'_{\textit{offset}} = Kc \cdot \theta'^N \quad (8)$$

Alternatively, the torque command $\tau_{COM2}$ generated by the velocity control unit 23 may be the value obtained in the following expression (9), in which the normal torque command component $\tau_2$ and the offset component $\tau_{\textit{offset}}$ that is dependent on the power of the velocity parameter are added. The specific example of the torque command component $\tau_2$ in this case will be shown by the following expression (10). The offset component $\tau_{\textit{offset}}$ may be obtained from the above-described expression (3) or (4).

$$\tau_{COM2} = \tau_2 + \tau_{\textit{offset}} \quad (9)$$

$$\tau_2 = Kpr \cdot (\theta'_{COM} - \theta') \quad (10)$$

Further alternatively, at least one of the control target values $\beta_r$, $\beta'_r$, $x_r$, and $v_r$ included in the normal wheel speed command component $\theta'_1$ shown in the expression (6) may be corrected to increase or decrease according to the power of the velocity parameter of the vehicle 100. More specifically, the correction term which is similar to the expression (3) or (4) dependent on the power of the velocity parameter of the vehicle 100 may be added to at least one of the control target values $\beta_r$, $\beta'_r$, $x_r$, and vr.

According to the second exemplary embodiment, velocity of the moving body can be suppressed by natural behavior for the occupant without switching modes between the mode in which the velocity limiting is performed and the mode in which the velocity limiting is not performed, as is similar to the first exemplary embodiment.

Note that the present invention is not limited to the above-described second exemplary embodiment, but may be changed as appropriate.

For example, the second control loop may be omitted. The yaw control unit 21 may be omitted. The velocity command may be corrected by adding the command value offset amount to the value of the first velocity command before correction, or may be corrected by other calculations including multiplication.

In the above first and second exemplary embodiments, description has been made of the vehicle 100 that travels by the manipulation of the pitch angle of the support member 101 by an occupant. Such a vehicle 100 travels by using the pitch angle of the support member 101 as a controlled variable, and executing the control loop to keep the inverted state of the support member 101 which is mechanically balanced. A moving body which applies a velocity target value as a result of manipulation by an occupant using a joy stick is also known. In such a moving body, the pitch angular velocity of the support member 101 may be used as the controlled variable. The present invention can be applied to the moving bodies of such types.

Although the moving body using a pair of wheels as the ground-contacting element has been described in the first and second exemplary embodiments, the present invention may be applied to moving bodies having other structures. For example, a moving body which uses a spherical rotator and a moving body which uses a cylindrical rotator instead of using wheels are known. The present invention can be applied to the moving bodies of such types.

The control processing executed by each control unit shown in FIGS. 2 and 4 may be executed by causing a computer such as a microprocessor to execute one or a plurality of programs. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A moving body comprising:
   a support member configured to support a subject and capable of oscillating at least in a front-back direction of the moving body during travelling of the moving body;
   at least one ground-contacting element with a circular cross section, the ground-contacting element attached to the support member;
   a drive portion configured to apply torque to the ground-contacting element; and
   a control loop coupled to the drive portion and configured to control the drive portion to adjust the torque applied to the ground-contacting element so as to allow the moving body to travel while keeping an inverted state of the support member, wherein
   the control loop controls the drive portion to apply normal torque and additional torque to the ground-contacting element, the normal torque being determined according to a deviation between a target value and a controlled variable including at least one of an inclination angular velocity and an inclination angle of the support member in the front-back direction, the additional torque being proportional to a velocity parameter of the moving body raised to the exponential power of N, the velocity parameter being proportional to a velocity of the moving body, wherein N is greater than 1.

2. The moving body according to claim 1, wherein since addition of an inertia force to the support member due to the additional torque raises an inclination of the support member in an opposite direction to a moving direction of the moving body, the control loop subsequently controls the drive portion to decrease the normal torque.

3. The moving body according to claim 1, wherein the control loop controls the drive portion based on a command value, the command value obtained by adding a first command value determined according to a magnitude of the deviation and a second command value determined according to the magnitude of the velocity parameter raised to the exponential power of N.

4. The moving body according to claim 1, wherein the control loop controls the drive portion so as to apply the additional torque by increasing or decreasing the target value according to the magnitude of the velocity parameter raised to the exponential power of N.

5. The moving body according to claim 1, wherein N is an odd number of three or more.

6. The moving body according to claim 2, wherein N is an even number of two or more, and the second command value is determined by multiplying the velocity parameter raised to the exponential power of N by a gain factor that can change sign based on a direction in which the moving body moves.

7. The moving body according to claim 1, wherein the control loop applies a filter to the velocity parameter to suppress time fluctuation of the velocity parameter.

8. The moving body according to claim 7, wherein the filter is a low-pass filter.

9. A method of controlling travelling of a moving body, the moving body comprising:
   a support member configured to support a subject and capable of oscillating at least in a front-back direction of the moving body during travelling of the moving body;
   at least one ground-contacting element with a circular cross section, the ground-contacting element attached to the support member;
   a drive portion configured to apply torque to the ground-contacting element; and
   a control loop coupled to the drive portion and configured to control the drive portion to adjust the torque applied to the ground-contacting element so as to allow the moving body to travel while keeping an inverted state of the support member, the method comprising:
   controlling the drive portion by the control loop to apply normal torque and additional torque to the ground-contacting element, the normal torque being determined according to a deviation between a target value and a controlled variable including at least one of an inclination angular velocity and an inclination angle of the support member in the front-back direction, the additional torque being proportional to a velocity parameter of the moving body raised to the exponential power of N, the velocity parameter being proportional to a velocity of the moving body, wherein N is greater than 1.

10. The method of controlling travelling of the moving body according to claim 9, wherein since addition of an inertia force to the support member due to the additional torque raises an inclination of the support member in an opposite direction to a moving direction of the moving body, the control loop subsequently controls the drive portion to decrease the normal torque.

11. The method of controlling travelling of the moving body according to claim 9, comprising controlling the drive portion by the control loop based on a command value, the command value obtained by adding a first command value determined according to a magnitude of the deviation and a second command value determined according to the magnitude of the velocity parameter raised to the exponential power of N.

12. The method of controlling travelling of the moving body according to claim 9, comprising controlling the drive portion by the control loop so as to apply the additional torque by increasing or decreasing the target value according to the magnitude of the velocity parameter raised to the exponential power of N.

13. A non-transitory computer readable media storing a program for causing a computer to exercise travelling control over a moving body, the moving body comprising:
  a support member configured to support a subject and capable of oscillating at least in a front-back direction of the moving body during travelling of the moving body;
  at least one ground-contacting element with a circular cross section, the ground-contacting element attached to the support member;
  a drive portion configured to apply torque to the ground-contacting element; and
  a control loop coupled to the drive portion and configured to control the drive portion to adjust the torque applied to the ground-contacting element so as to allow the moving body to travel while keeping an inverted state of the support member, the travelling control comprising:
  controlling the drive portion by the control loop to apply normal torque and additional torque to the ground-contacting element, the normal torque being determined according to a deviation between a target value and a controlled variable including at least one of an inclination angular velocity and an inclination angle of the support member in the front-back direction, the additional torque being proportional to a velocity parameter of the moving body raised to the exponential power of N, the velocity parameter being proportional to a velocity of the moving body, wherein N is greater than 1.

14. The non-transitory computer readable media according to claim 13, wherein since addition of an inertia force to the support member due to the additional torque raises an inclination of the support member in an opposite direction to a moving direction of the moving body, the control loop subsequently controls the drive portion to decrease the normal torque.

15. The non-transitory computer readable media according to claim 13, comprising controlling the drive portion by the control loop based on a command value, the command value obtained by adding a first command value determined according to a magnitude of the deviation and a second command value determined according to the magnitude of the velocity parameter raised to the exponential power of N.

16. The non-transitory computer readable media according to claim 13, comprising controlling the drive portion by the control loop so as to apply the additional torque by increasing or decreasing the target value according to the magnitude of the velocity parameter raised to the exponential power of N.

17. The moving body according to claim 1, wherein the velocity parameter is the velocity of the moving body, a rotational speed of the ground-contacting element, or a rotational speed of a motor included in the drive portion.

* * * * *